United States Patent [19]
Waelde

[11] Patent Number: 5,437,498
[45] Date of Patent: Aug. 1, 1995

[54] VEHICLE SEAT WITH SIDE BOLSTER REINFORCEMENT

[75] Inventor: Todd W. Waelde, Canton, Mich.

[73] Assignee: Hoover Universal, Inc., Plymouth, Mich.

[21] Appl. No.: 199,755

[22] Filed: Feb. 22, 1994

[51] Int. Cl.⁶ .................................................. A47C 7/20
[52] U.S. Cl. .................... 297/452.34; 297/452.2; 297/452.36; 297/452.24
[58] Field of Search .................. 297/284.4, 284.9, 391, 297/396, 452.18, 452.20, 452.30, 452.31, 452.32, 452.34, 452.35, 452.36, 452.23; 5/653

[56] References Cited

U.S. PATENT DOCUMENTS

| | | | |
|---|---|---|---|
| 4,350,390 | 9/1982 | Ogawa | 297/452.18 |
| 4,718,720 | 1/1988 | Braun et al. | 297/391 X |
| 4,756,574 | 7/1988 | Andres et al. | 297/452.34 X |
| 4,796,955 | 1/1989 | Williams | 297/452.23 X |
| 5,071,190 | 12/1991 | Tame | 297/391 X |
| 5,257,853 | 11/1993 | Elton et al. | 297/391 |

FOREIGN PATENT DOCUMENTS 2126476  3/1984  United Kingdom ........... 297/452.18

Primary Examiner—Peter R. Brown
Attorney, Agent, or Firm—Harness, Dickey & Pierce

[57] ABSTRACT

A vehicle seat in which the seat cushion and/or seat back are formed with side bolsters that are reinforced by hollow inserts, preferably blow molded, that are attached to the seat cushion or seat back frame in the area of the side bolster and which are then covered by the foam pad. The hollow reinforcements increase the lateral support provided by the seat to the seat occupant at a relatively low added cost. The inserts may be attached to the seat component frame by a number of methods including the use of cable ties wrapped around the insert and the frame, rivets, snap members, clips, etc. The inserts, in addition to providing improved reinforcement in the bolster area may also result in a weight reduction as compared to a conventional wire reinforcement of the foam bolsters.

6 Claims, 3 Drawing Sheets

VEHICLE SEAT WITH SIDE BOLSTER REINFORCEMENT

BACKGROUND AND SUMMARY OF THE INVENTION

The present invention relates to vehicle seats having side bolsters in the seat cushion and/or seat back and in particular to seats with reinforcement of the foam forming the side bolsters.

Vehicle seats, particularly single passenger bucket seats are often formed with side bolsters along the sides of the seat cushion and/or the seat back. Such side bolsters provide a snug fit which is often desired by a seat occupant. The side bolsters are formed by providing increased foam thickness in the seat cushion or seat back along the lateral side edges of the seat cushion or seat back seating surfaces.

However, merely increasing the foam thickness to provide a raised portion along the side edges does not produce the desired increase in support. The foam by itself does not hold up over time to maintain the support. One solution to provide adequate support for the foam in the bolster is to build up the seat component frame in the area of the side bolster. One way of accomplishing this is by welding a wire or tube to the seat component frame which is raised above the frame into the bolster area. The foam of the bolsters surrounds this reinforcing wire or tube and is thus held in place. Such an addition to the seat component frame, however, requires additional tooling and fixtures to properly locate and attach the wire or tube to the component frame. This increases the time and cost of the seat component Another solution has been to form the foam pad as a composite foam having a foam block located in the bolster area which has a higher density than the remainder of the foam pad. This is accomplished in one of two ways, either forming both the low and high density foam pads separately and adhesively bonding one to the other or first forming the high density foam blocks and inserting these blocks into the mold for making the foam pad. Both these procedures add complexity and cost to the formation of the foam pad.

Accordingly, it is an object of the present invention to provide a simple and low cost structure for reinforcing the seat component foam pad in the area of the side bolsters.

It is a feature of the present invention to use a rigid blow molded hollow insert that is attached to the seat component frame in the area of the side bolster and which is then covered by the foam pad. This increases the lateral support to the occupant at a relatively low added cost. The blow molded inserts may be attached to the frame by a number of methods including the use of ties wrapped around the insert and the frame, rivets, snap members, clips or the like. The blow molded inserts can be for non-handed use or can be component specific. In addition to providing improved reinforcement in the bolster area, the blow molded inserts may also result in a weight reduction as compared to a conventional wire reinforcement.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
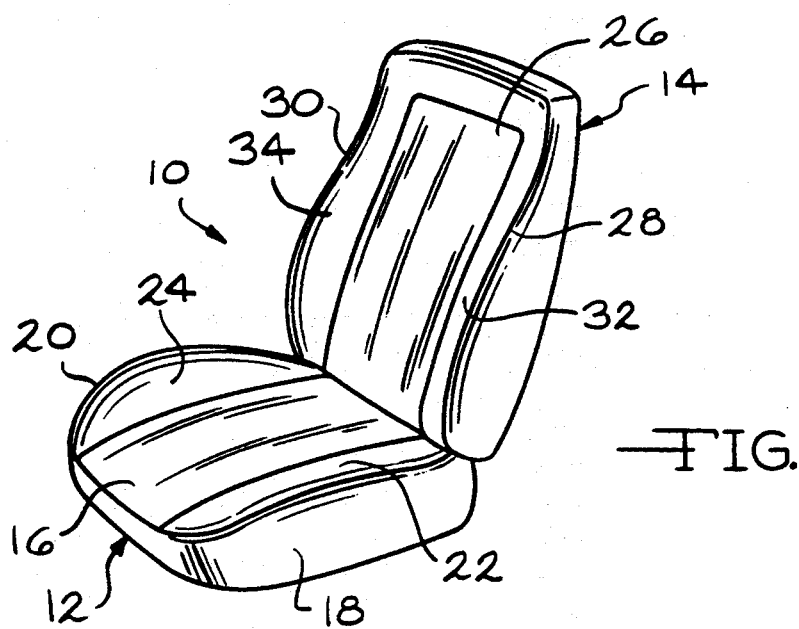
FIG. 1 is a perspective view of a vehicle seat with the side bolster reinforcement of the present invention.

A vehicle seat having seat components with reinforced bolsters according to the present invention is shown in FIG. 1 and designated generally at 10. Seat 10 includes a generally horizontal seat cushion 12 and a generally upright seat back 14 extending upwardly at the rear of the seat cushion 12. The seat cushion 12 has a generally planar seating surface 16 having a pair of lateral side edges 18 and 20. The foam pad of the seat cushion 12, shown and described below, is raised from the seating surface 16 along the lateral side edges 18 and 20 forming side bolsters 22 and 24 along side the seating surface. In a similar manner, the seat back 14 is formed with a generally planar seating surface 26 having lateral side edges 28 and 30 at which the foam of the seat back is raised from the seating surface 26 to form side bolsters 32 and 34. The side bolsters of the seat cushion and seat back wrap around a seat occupant, providing a desired snug feeling of the seat around the occupant. The seat of the present invention includes reinforcement of the seat cushion and seat back foam pads in the area of the bolsters to provide improved support compared to the support produced with non-reinforced foam in the bolster area.

Figure 2:
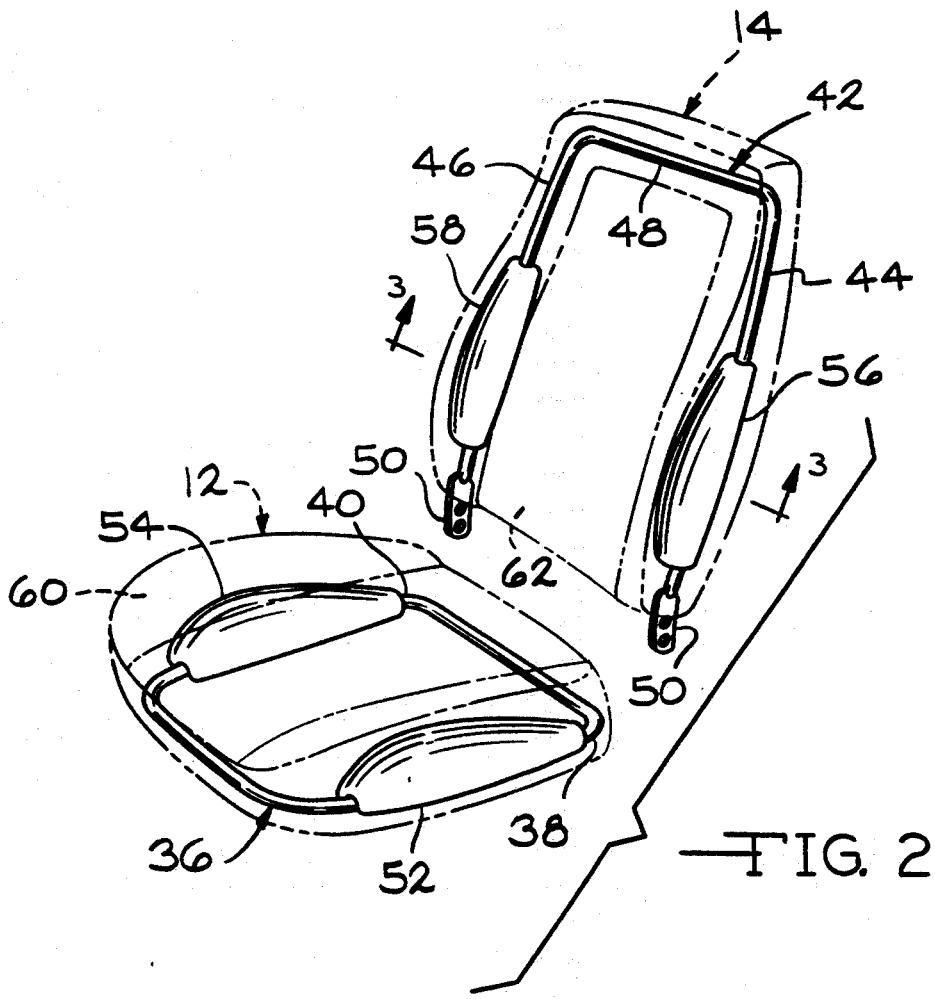
FIG. 2 is an exploded perspective view of the seat cushion and seat back showing the frames of the seat components and the bolster reinforcements attached to the frames.

The structures of the seat cushion and seat back are described in greater detail with reference to FIG. 2. The seat cushion 12 includes a frame 36 which is generally rectangular in shape and formed by a bent tube. This frame structure is shown as one example of a seat cushion frame. Other frame structures can be used with the present invention. The seat cushion frame 36 includes side members 38 and 40 which extend along the lateral side edges 18 and 20 of the seat cushion, beneath the bolsters 22 and 24.

The seat back 14 is similarly constructed with a frame 42 which is generally U-shaped, having a pair of side members 44 and 46 and an upper cross member 48. The frame 42 is also constructed of a bent tube. The lower ends 50 of the side members 44 and 46 are attached to a supporting structure (not shown) in a conventional manner for mounting a seat back in a vehicle seat. The seat cushion and seat back frames may have various support structures extending laterally across the frames between the side members to support the foam pad 60 of the seat cushion and the foam pad 62 of the seat back between the frame side members. These supporting structures can be of any of a variety of conventional configurations and have been deleted to direct the focus of the drawings to the bolster reinforcement of the present invention.

To reinforce the side bolsters in the seat cushion and seat back, rigid hollow inserts 52, 54, 56, and 58 are attached to the side members of the seat cushion and seat back frame. These inserts are attached to the frame side members and extend into the foam forming the side bolsters to reinforce the seat cushion foam pad 60 and the seat back foam pad 62. Blow molding is the preferred method for making the hollow inserts. The hollow body reinforcements can be made from a variety of structural resins.

Figure 4:
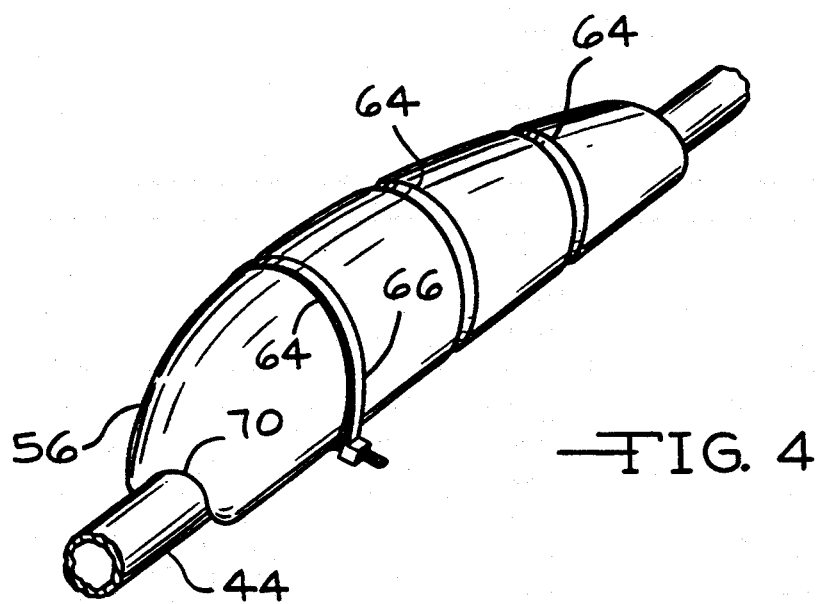
FIG. 4 is a cut-away perspective view showing the attachment of the hollow bolster reinforcement to the seat back frame.
Figure 4A:
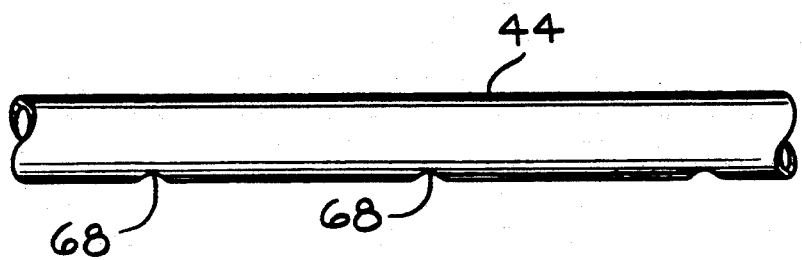
FIG. 4A side view of the frame side member of FIG. 4 to which the reinforcement is mounted.

With reference to FIGS. 4–7, various methods of attaching the inserts to the frame side members are shown. In FIG. 4, the blow molded insert 56 is shown with a plurality of circumferential grooves 64 extending about the insert 56. The grooves form seats for elongated ties such as single piece cable ties 66 which are wrapped circumferentially around both the blow molded insert 56 and the frame side member 44. Preferably, the tube 44 is formed with recesses or detents 68 in its lower surface which align with the grooves 64 in the inserts. By aligning the detents in the tube with the recesses in the insert, the proper location of the insert on the tube is ensured. The blow molded insert 56 includes a longitudinal recess 70 along its bottom edge for reception of the frame side member therein.

Figure 5:
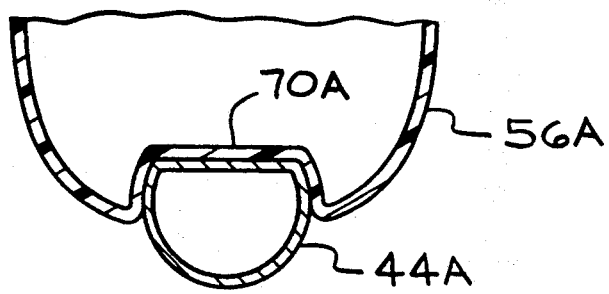
FIGS. 5, 6, and 7 are sectional views illustrating alternative embodiments of the reinforcement attachment to the seat component frame.

FIG. 5 shows a variation in the shape of the frame side member 44 and is designated as 44A. The top edge of the side member is flattened and the longitudinal recess 70A in the blow molded insert 56A is likewise shaped with a flat surface. These flat surfaces provide increased resistance to rotation of the blow molded insert about the frame side member. The insert can be attached with ties as shown in FIG. 4.

Figure 6:
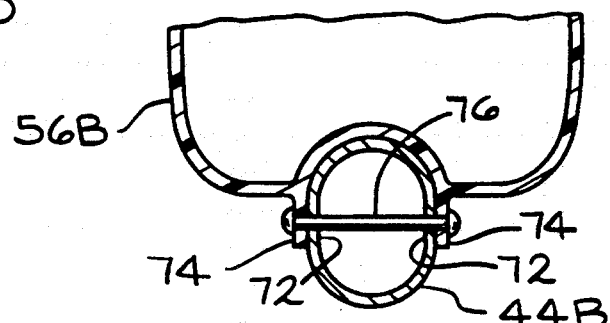

FIG. 6 shows another embodiment for attaching the blow molded insert 56B to the frame side member 44B. In this embodiment, the frame side member 44B is formed with two flat sides 72. The blow molded insert 56B in turn is molded with a pair of downwardly extending flanges 74 which cover the flat sides 72 of the frame member 44B. A rivet or other similar fastener 76 extends through the flanges of the insert and the sidewalls of the frame side member to secure the blow molded insert 56B to the frame side member.

Figure 7:
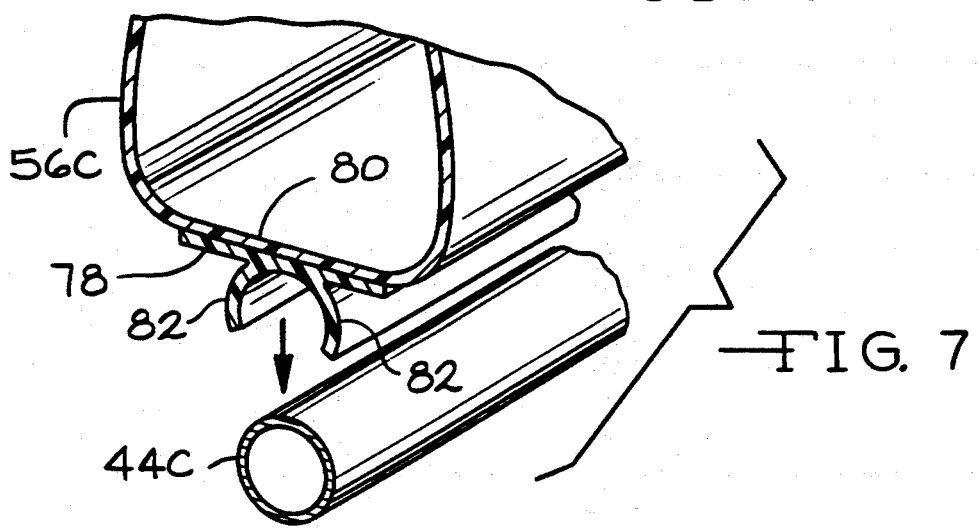

With reference to FIG. 7, yet another embodiment for attachment of the blow molded insert to the frame side member is shown. In this embodiment, the blow molded insert 56C has a clip 78 attached to the insert bottom wall 80. The clip 78 has a pair of downward extending tangs 82 which form a concave cavity for reception of the frame side member 44C therein. The tangs 82 are resilient to snap over the frame side member 44C. The clip 78 can be adhesively attached to the blow molded insert or attached by rivets, push pins, etc. Additional methods of attaching the inserts to the frame can be used as well. Once the foam is applied to the frame, the seat component is covered with a seat cover material such as vinyl, fabric or leather in a conventional manner.

Figure 3:
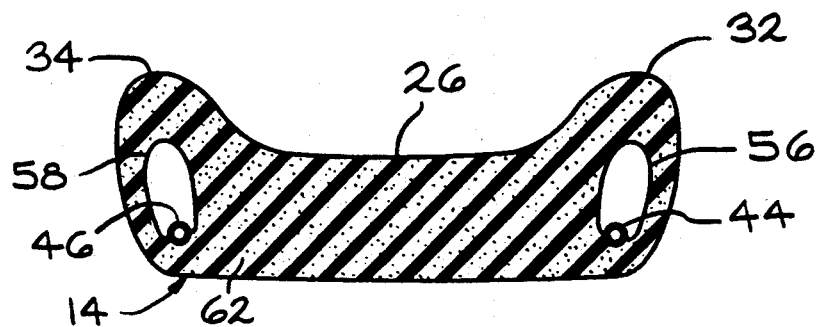
FIG. 3 is a sectional view of the seat back as seen from substantially the line 3—3 of FIG. 2.
Figure 8:
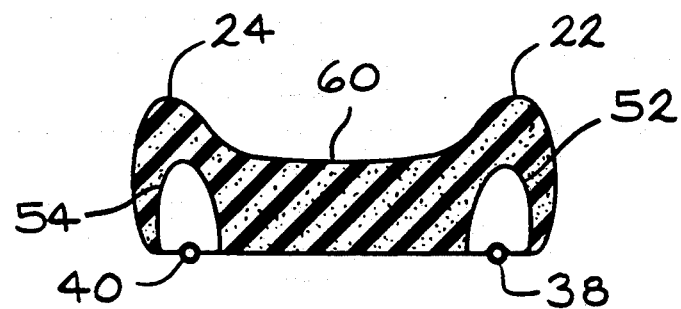
FIG. 8 is a section view of the seat back frame similar to FIG. 3 showing a of the seat back construction.

The blow molded inserts extend into the foam pads of the seat cushion or seat back into the bolster area to provide additional support to the foam in that area. The foam pad may be molded around the frame and insert to encapsulate the frame as shown in FIG. 3. Alternatively, the foam pad may be previously molded with cavities for the blow molded inserts. Such a pad is placed over the frame and the inserts in what is called a lay-on pad construction and is shown in FIG. 8. The blow molded inserts provide improved support for the foam pad in the side bolster area which results in improved comfort and feel for a seat occupant. By blow molding the inserts they are easily manufactured and are easily attached to the seat component frames using low cost fasteners.

It is to be understood that the invention is not limited to the exact construction illustrated and described above, but that various changes and modifications may be made without departing from the spirit and scope of the invention as defined in the following claims.

I claim:

1. A component for a vehicle seat comprising:
    a foam pad having a first portion and a second portion which is raised relative to said first portion;
    a support frame upon which said pad is carried, said frame having a frame member disposed along said second portion of said foam pad; and
    a rigid hollow plastic body attached to said frame member and extending into and being embedded within said second portion of said foam pad to reinforce said foam pad at said second portion with a constant amount of support.

2. The vehicle seat component of claim 1 wherein said hollow bodies are attached to said frame by a plurality of ties wrapped circumferentially around said bodies and said frame side members.

3. The vehicle seat component of claim 1 wherein said hollow bodies include a pair of spaced mounting flanges disposed on opposite sides of said frame side members and further comprising rivets extending through said flanges and said frame side members to attach said hollow bodies to said frame side members.

4. A component for a vehicle seat comprising:
    a foam pad having a seating surface with a pair of lateral side edges, said foam pad being raised from said seating surface along said lateral side edges to form bolsters along said lateral side edges of said seating surface;
    a support frame upon which said pad is carried, said frame having a pair of side members with one said member being disposed along each of said lateral side edges of said seating surface; and
    a pair of rigid hollow bodies, one body of said pair being attached to one of said side members and the other body of said pair being attached to the other of said side members, said hollow bodies extending into and being embedded within said foam pad at said lateral side edges to reinforce said foam pad at said bolsters with a constant amount of support.

5. The vehicle seat component of claim 1 wherein said hollow bodies are blow molded bodies.

6. The vehicle seat component of claim 1 wherein said hollow bodies and said side members have flattened engaging surfaces to resist rotation of said hollow bodies relative to said frame side members.

* * * * *